Patented Aug. 2, 1949

2,478,146

UNITED STATES PATENT OFFICE 2,478,146

BENZENESULFONYLTHIAZOLES AND PREPARATION OF THE SAME

James H. Williams, Riverside, and Richard O. Roblin, Jr., Stamford, Conn., assignors to American Cyanamid Company, New York, N. Y., a corporation of Maine No Drawing. Original application December 26, 1940, Serial No. 371,828. Divided and this application July 14, 1942, Serial No. 450,910

3 Claims. (Cl. 260—239.6)

This invention relates to a new class of chemical compounds and methods for their preparation. More particularly it relates to benzenesulfonylthiazodes.

This new class of chemical compounds are those represented by the following general formula:

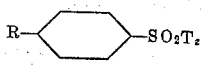

in which R represents a radical convertible into an amino group including radicals such as nitro, acylamino, and azo radicals, and $T_z$ is a thiazole radical. When R represents a nitro group or an azo group, such groups can be converted to an amino group by reduction. When R represents an acylamino group, it can be converted to an amino group by hydrolysis.

The compounds of this invention are useful as chemotherapeutic agents, as intermediates in the preparation of other pharmaceuticals and as intermediates for the production of azo dyes and other compounds.

The compounds of the present invention in which R is an acylamino radical may be prepared by reacting a *p-acylaminobenzene* sulfinic acid with thiazole compounds having an active halogen attached to a carbon atom on the thiazole ring. In the reaction a hydrogen halide is liberated, and it is therefore desirable where a good yield is to be obtained to provide a basic substance which will unite with the hydrogen halide evolved. This may be effected by carrying out the reaction in a suitable medium and adding an excess of sodium hydroxide or other alkali. This reaction results in the production of acyl sulfanilyl heterocyclic compounds which can readily be converted into sulfanilyl heterocycles by hydrolysis. In carrying out the reaction p-acylaminobenzene sulfinic acids generally are applicable and the acyl radical may therefore be any acyl group such as acetyl propionyl, butyryl, dodecanyl, benzoyl, sulfonyl, sulfanilyl, nicotinyl, and the like, or any acyl radical so long as it does not interfere with the reaction between the sulfinic acid radical and the halogen on the heterocyclic ring.

Compounds of the general formula in which R is a nitro, halogen, or azo radical may be produced by reacting a p-nitrobenzene sulfinic acid, a p-halogen benzene sulfinic acid, or a p-azobenzene sulfinic acid with a heterocyclic compound containing an active halogen substituent. These compounds may then, if desired, be converted into the p-amino compounds by reduction of the nitro and azo groups or by reaction of the halogen group with ammonia.

The invention will be described in greater detail in conjunction with the following specific examples which are merely illustrative of the preferred methods of preparing representative compounds of the class and are not intended to limit the scope of the invention. The parts are by weight except in the case of liquids which are expressed in corresponding parts by volume.

EXAMPLE 2-(N-acetylsulfanilyl)-thiazole

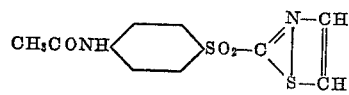

Twenty-nine parts of 2-bromothiazole are refluxed with 52 parts of potassium p-acetylaminobenzene sulfinate in 125 parts of carbitol in the presence of small amounts of iodine and copper powder. At the end of three hours, refluxing is stopped, the mixture is made slightly alkaline with alcoholic sodium hydroxide and cooled. The precipitate present is filtered off and recrystallized from about 2300 parts of alcohol. The crystalline 2-(N-acetylsulfanilyl)-thiazole has a melting point of about 238° C.

In the above example the p-acetylaminobenzene sulfinic acid can be replaced by p-acylaminobenzene sulfinic acids such as p-butyryl, p-propionyl, p-nicotinyl, p-valeryl, p-caproyl aminobenzene sulfinic acids, and the like, to give a number of related compounds. The acetyl compound is generally employed if the product is to be ultimately subjected to a hydrolysis step to convert the acylamino group to an amino group since the acetylated compounds are more readily available and are the cheapest. However, in other cases where the acylated sulfanilyl compound is to be used as such it may be desirable to use some other acylated compound as the reactant in the place of p-acetylaminobenzene sulfinic acid, the selection depending upon the particular use to which the product is to be put. In the foregoing example representative heterocyclic compounds having an active halogen substituent have been used. It is to be noted that the heterocyclic radical may also have other substituent groups on the nucleus and the present invention is intended to include heterocyclic compounds generally, that is to say, substituted and unsubstituted. For example, any one of the following types of heterocyclic compounds may be used in carrying out the reaction described to produce compounds coming within the scope of the present invention: halogen substituted pyridines, halogen substituted thiazoles, halogen substituted thiadiazoles, halogen substituted tetrazoles, halogen substituted pyrazolones, halogen substituted pyrimidines, such as 2-chloro-5-nitropyrimidine, halogen substituted quinolines, and the like.

The present application is a division of our co-pending application Serial No. 371,828 filed December 26, 1940, now abandoned.

The above description and examples are intended to be illustrative only. Any modification or variation therefrom which conforms with the spirit of the invention is intended to be included within the scope of the claims.

What we claim is:

1. Compounds having the following general formula:

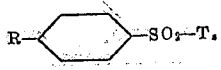

in which R is a member of the group consisting of radicals reducible to an amino group and radicals hydrolyzable to an amino group, and Tz is a thiazole radical, wherein the —SO2— group is linked directly to a carbon atom of the thiazole ring.

2. Compounds having the following formula:

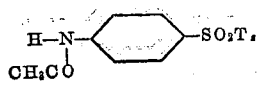

in which Tz is a thiazole radical, wherein the —SO2— group is linked directly to a carbon atom of the thiazole ring.

3. A process which comprises reacting an alkali metal salt of p-acylaminobenzene sulfinic acid with a nuclear mono-halogen substituted thiazole to produce an N-acyl sulfanilyl thiazole.

JAMES H. WILLIAMS.
RICHARD O. ROBLIN, Jr.

REFERENCES CITED

The following references are of record in the file of this patent:

UNITED STATES PATENTS

| Number | Name | Date |
| --- | --- | --- |
| 1,936,721 | Landers | Nov. 28, 1933 |
| 2,192,828 | Daniels | Mar. 5, 1940 |
| 2,224,964 | Huesmann | Dec. 17, 1940 |
| 2,227,400 | Roblin | Dec. 31, 1940 |
| 2,259,222 | Ewins | Oct. 14, 1941 |
| 2,287,154 | Warnat | June 23, 1942 |

OTHER REFERENCES

Journal Amer. Chem. Soc., vol. 61, Oct. 1939, pages 2763–2765.

Journal Amer. Chem. Soc., vol. 62, Dec. 17, 1940, pages 3508–3510.

J. A. C. S., vol 63, pages 1930–1934, July 1941.

Ser. No. 371,412, Dohrn, et al. (A. P. C.) pub. June 1, 1943.